Figure 1:
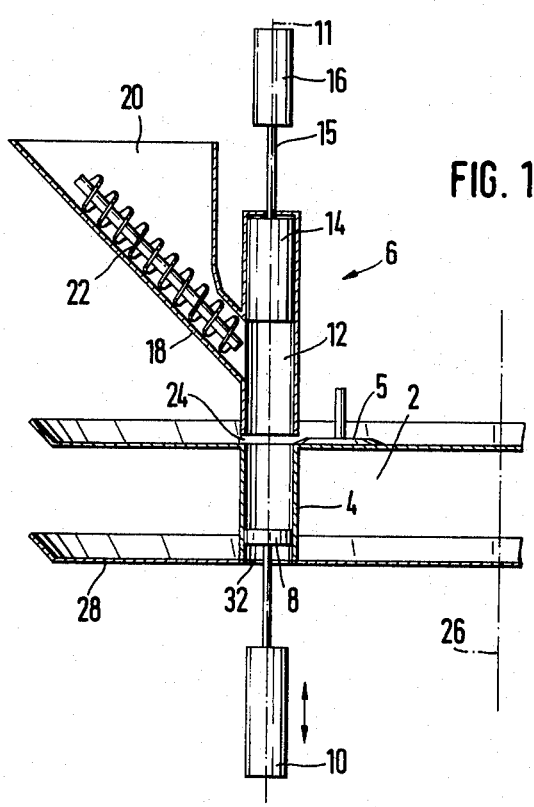

United States Patent [19]

Jentsch

[11] 4,106,160
[45] Aug. 15, 1978

[54] APPARATUS FOR VOLUME DOSING COMPRESSIBLE, LUMPY MATERIAL

[76] Inventor: Hans G. Jentsch, Daimlerstrasse 4, Essen 1, Fed. Rep. of Germany

[21] Appl. No.: 795,221

[22] Filed: May 9, 1977

[30] Foreign Application Priority Data

May 11, 1976 [DE] Fed. Rep. of Germany ....... 2620677

[51] Int. Cl.² .................... B05B 1/38; B65B 63/02
[52] U.S. Cl. ........................... 17/32; 425/317; 425/353
[58] Field of Search ............... 17/32; 425/352, 353, 425/355, 357, 259, 260, 261

[56] References Cited

U.S. PATENT DOCUMENTS

| 1,781,339 | 11/1930 | Oliver et al. | 17/32 |
| 2,770,202 | 11/1956 | Garfunkel | 17/32 X |
| 3,153,809 | 10/1964 | Weien | 17/32 |

*Primary Examiner*—J. M. Meister

[57] ABSTRACT

Apparatus for the volume portioning of compressible, lumpy material, especially pieces of meat and prepared foods, comprising: a receiving apparatus with at least one passage opening of constant cross section which laterally defines a portioning chamber; a portioning piston with a cross sectional surface complementary to the cross section of the passage opening, which piston can be pushed into the portioning chamber at a first end, is displaceable axially and fixable in at least one position within the latter in order to establish the volume of the portioning chamber formed in the passage opening; a filling apparatus disposed on the fill side of the receiving apparatus, opposite the portioning piston, and having a discharge orifice aligned with the second open end of the passage opening and one compressing piston displaceable coaxially to the portioning piston at least in the filling operation; a slot provided between the second opening of the passage opening and the discharge aperture of the filling apparatus; and a cutting knife or the like which is mounted for movement transversely of the axis of movement of the two pistons and can be introduced into the slot such that it substantially snugly closes off the second open end of the passage opening.

12 Claims, 2 Drawing Figures

APPARATUS FOR VOLUME DOSING COMPRESSIBLE, LUMPY MATERIAL

The invention relates to an apparatus for the volume portioning of yielding and compressible, lumpy material, e.g., meat, rice or noodle dishes, chopped vegetables, etc., with a portioning chamber, a filling apparatus and an ejection means for the ejection of the portioned material.

An apparatus of comparable kind is known in the form of tableting machines. In these machines, the powdered or finely granular material is briefly pressed and, after the raising of the pressing plunger, it is struck off evenly at the top of the portioning mold. Volume portioning in the case of powdered or finely granular material, however, is relatively unproblematical, since the material, due to its consistency, behaves, upon being poured into the portioning mold and upon being pressed, similarly to a liquid, that is, it fills out the portioning chamber virtually completely under its own weight. Correspondingly simple is also the limiting on the fill end, which, as stated, can be performed by simply striking it off.

Hitherto the problem of the volume portioning of lumpy material, e.g., of pieces of meat, has hitherto remained largely unsolved. This is because the pieces of meat, upon being poured into a portioning chamber, have an always different form and position, and accordingly fill out the volume of the portioning chamber differently from case to case. It is therefore necessary to compress the pieces of meat in the portioning chamber so that they will adapt themselves as extensively as possible to the shape of the portioning chamber under the effect of pressure. The striking off of the portions of the material which project upwardly, for example, from the portioning chamber is impossible, however, because, due to their irregular position and form, they terminate at an undefined height, and, especially, upon the relieving of the pressure of a compressing piston, they return to a likewise undefinable expanded position.

Particularly in the food and packing industry, however, there is a need for automatic volume portioning also for lumpy material, such as meat, and it has not been possible hitherto to satisfy this need with usable accuracy.

The invention, therefore, is addressed to the problem of making available an automatable or mechanizable apparatus for the volume portioning of compressible, lumpy material, which will operate with high accuracy, namely within tolerance limits between 0.5 and 2%.

Setting out from an apparatus of the initially described kind, the invention proposes for the solution of this problem that the portioning chamber be defined by a straightwalled passage opening constructed in a receiving component, that a portioning piston with a cross-sectional surface at one end which complements the cross section of the passage opening be disposed for insertion into the portioning chamber and be fixable in at least one defined feeding position, that on the filling side of the receiving component that is opposite the portioning piston the filling apparatus provided with a compressing piston be so disposed that the compressing piston is displaceable coaxially with the portioning piston at least in the filling position, that furthermore a knife movable transversely of the axis of the passage opening be mounted on the filling side, which is introducible into a slot between the passage opening and a housing receiving the filling apparatus and snugly closes off the end of the portioning chamber that is opposite the portioning piston, and that the receiving component and/or the filling apparatus are displaceable relatively to one another for alternating between the filling and ejecting positions. In the apparatus of the invention, the compressible, lumpy material, e.g., meat in pieces, is compressed by the compressing piston with the portioning piston fixed, doing so preferably with a given pressure, to such an extent that the meat completely fills up the interior of the portioning chamber. After a preset limit pressure is reached, the compressing piston stops over the portioning chamber area, and the knife defines the portioning chamber at the filling side, portions of meat projecting beyond the portioning chamber being severed precisely at the proper point. The slot which remains open also during the filling for the engagement of the knife between the portioning chamber and the filling chamber virtually does not interfere at all with the filling and compressing procedure, since the lumpy material is unable to pass through the comparatively narrow slot. The compressing piston pressure can be made so high that the compressible material, despite its lumpy consistency, will completely fill the portioning chamber.

A functional multiple utilization of the knife and hence a reduction of the constructional expense of the described apparatus can be achieved in further development of the invention by mounting the knife rotatably about an axis parallel to the axis of the compressing piston and providing it with such a path of movement and construction that, when it engages in the slot between the passage opening and the filling apparatus it will close in a substantially snug manner the output-side opening of the filling apparatus. In the above-described manner, in addition to its mere severing function whereby the portioning volume is defined at the point of severance, the knife also performs closing functions for the portioning chamber and filling apparatus. The knife, which can also be mounted displaceably, closes the portioning chamber at the filling end and prevents the springing back of the compressible material after portioning, and on the other hand prevents any further issuance of the material in the filling chamber under the pressure of the compressing piston.

Preferably, the portioning piston is fixable at various depths of penetration in the portioning chamber for the adjustment of different portioning volumes. The mnner of operation of the overall apparatus remains unchanged even in the case of a change of the depth of penetration of the portioning piston in the portioning chamber.

In order to keep the portioning volume within the tolerance limit in each individual portioning action, provision is made in further development of the invention for the compressing piston to be actuable with at least one defined compressing pressure.

Figure 2:
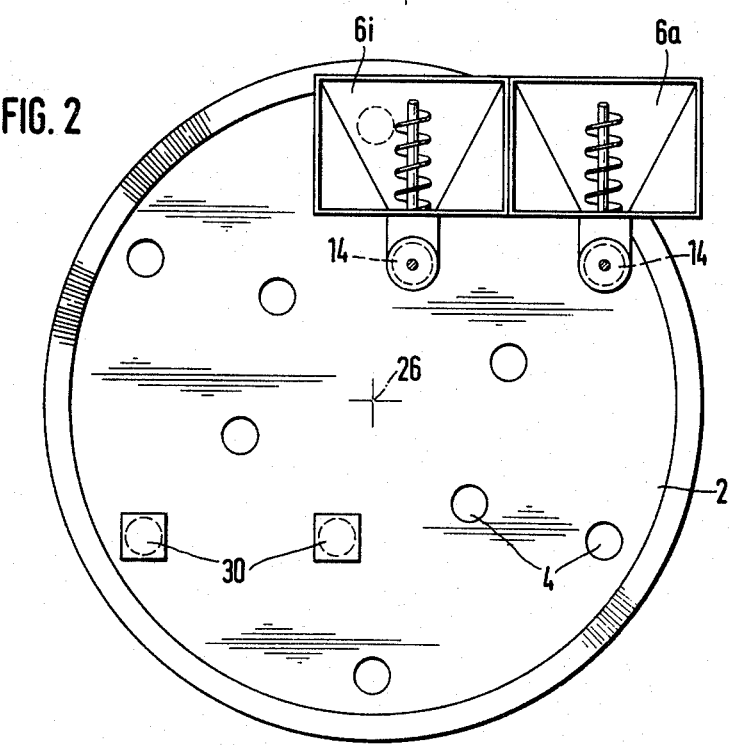

The invention is further explained hereinafter with the aid of embodiments represented in the drawing. In the drawing, FIG. 1 is a diagrammatic cross section through a portion of an embodiment of the invention which is representative of the basic construction and operation of the invention, and FIG. 2 is a diagrammatic top plan view of another embodiment of the portioning apparatus of the invention.

The portioning apparatus represented in the drawing has a receiving component 2 with at least one portioning chamber 4, a filling apparatus generally identified as 6, and a portioning piston 8 entering into the portioning chamber 4 from the side of receiving component 2 opposite the filling apparatus 6. The portioning chamber or each portioning chamber 4 is constructed as a hollow cylinder open at both ends. The portioning piston 8 which is actuable by a drive 10 has an external cross section complementary to the internal cross section of the portioning chamber 4, and its axis of movement precisely coincides with the center axis 11 of the cylindrical portioning chamber. The portioning piston 10 forms during the filling and portioning process the bottom surface of portioning chamber 4, which is displaceable for adjustment of the portioning volume.

The filling apparatus has a cylindrical housing 12 in which a compressing piston 14 is slidingly guided on an axis of movement located on the center axis 11. The compressing piston 14 is actuable through its piston rod 15 emerging from the filling housing 12 by a drive 16 constructed as a pressure cylinder. Below the outer end position of the compressing piston 14, a material feed connection 18 slopes laterally from the filling housing 12, merging funnel-wise into a supply container 20 as represented in FIG. 1. A feed screw 22 extends from the supply container 20 to the material feed connection 18, but terminates outside of the interior of filling housing 12 forming the guide for the compressing piston 14. The path of movement of the compressing piston 14 is therefore not interfered with by the feed screw 22 providing for a positive feeding of the lumpy material from the supply container into the filling housing 12.

The hollow cylindrical filling housing 12 has, in the embodiment described, a cross sectional shape matching the internal cross section of the portioning chamber. At the lower end opposite the open upper end of the portioning chamber 4, the filling housing 12 has a discharge opening through which the material can be discharged into the cylindrical portioning chamber 4 in the filling and portioning position represented in FIG. 1. Between the top of the disk-like receiving component 2 and the lower end of the filling housing 12 forming the discharge opening there is provided a narrow slot 24 into which a rotatable knife 5 having an axis of rotation parallel to the center axis 11 can be turned.

After the filling of the portioning chamber 4, the material consisting, for example, of pieces of meat, is cut apart by the knife 5 rotating virtually flush with the full opening of the portioning chamber 4, and the portioning chamber cavity is also closed off at the top. After the cutting operation of the rotating knife 5 has been performed, the portioning chamer is defined at the bottom by the portioning piston 8 and at the top by the knife 5.

The portioning piston 8 is fixable against displacement, at various prescribed depths of penetration in the portioning chamber 4 by means of the drive 10 associated with said portioning piston. It thus forms a back-up for the compression stroke of the compressing piston 14, so that the capacity in the portioning chamber 4 is precisely defined.

In the embodiment described, the receiving component 2 is in the form of a rotating disk or table whose axis of rotation 26 is vertical and parallel to the center axis 11 of each portioning chamber and of the portioning and compressing pistons. The portioning chambers are passage openings in the rotary disk 2. Under the rotary disk there is mounted a stationary bottom plate 28 in which an aperture 32 having an aperture cross section corresponding to the inside cross section of the portioning chamber is provided coaxially with each portioning piston 8 and coaxially with an ejecting means 30 (FIG. 2). Each portioning chamber terminates directly above the upper side of the bottom plate 28, so that the latter, upon the rotation of the rotary disk 2, snugly closes the portioning chambers located outside of the filling and ejection points.

As seen in FIG. 2, the rotary disk 2 has two series of cylindrical portioning chambers 4 disposed concentrically about the axis of rotation 26. The portioning chambers are disposed in both circles at the same angular distance apart. With each circularly disposed group of portioning chambers 4 there is associated one stationary filling apparatus 6i and 6a with portioning pistons, and one ejecting means 30 in the form of an ejecting piston. The filling apparatus 6i and 6a are at angular distances identical to the spacing of the ejecting pistons associated with them, and the relative disposition of the portioning chambers 4 in relation to the filling apparatus 6i and 6a and to the ejecting means 30 is made such that portioning chambers in the two concentric series are simultaneously in alignment with the filling apparatus and the ejecting means. Thus, the filling or portioning of two portioning chambers disposed in the two circular series and the ejection of the material from two other chambers can be accomplished in a single cycle of operation.

The above-described portioning apparatus operates as follows: The lumpy material in the supply container 20 is transferred by the feed screw 22 into the interior of the cylindrical filling housing 12 and from there to the coaxially aligned portioning chamber 4, the portioning piston being fixed in the defined portioning position in the portioning chamber 4. It forms the bottom surface of the portioning chamber. Then the compressing piston 14 is lowered with a given pressure, the shape of the compressible, lumpy material adapting itself virtually perfectly to the cylindrical mold formed in the portioning chamber 4. The upper limit of the portioning chamber is formed by the knife 5 which performs a severing cut in the slot 24 while the compressing pressure of piston 14 is sustained, the bottom side of the knife 5 snugly adjoining the upper end of the portioning chamber opening. At the same time the discharge opening of the fill housing 12 is closed virtually snugly by the upper side of the knife 5, so that no material can be ejected from the filling apparatus even upon relative movement of the receiving component 2 with respect to the filling apparatus.

Since the definition of the portioning chamber volume by the snug severance can be performed while the compression pressure is sustained, the volume can be portioned within extraordinarily small tolerances of approximately 1% despite the lumpy consistency of the material. The setting of the portioning volume is performed by means of the portioning piston 8 which can be fixed in various positions, while the severance can be performed always at the same point. The portioning piston 8 is lowered after the portioning, i.e., after the performance of the severance by the knife 5, to such a distance that its active piston surface is in one plane with the upper side of the bottom plate 28, which is provided at the filling point. Then the receiving component 2 with the portioning chambers 4 can be moved without hindrance in a horizontal plane, that is, about the axis of rotation 26 in the embodiment described. In the case of the construction of the rotary disk 2, each step of rotation after a portioning is of such magnitude that the portioning chamber next following in the direction of rotation is in alignment with the filling apparatus 6i or 6a, as the case may be, and with the corresponding portioning piston 8. Then the portioning piston 8 is pushed into the portioning chamber 4 to the depth of penetration corresponding to the portion setting, the discharge opening of the filling apparatus 6 is opened by the swinging of the severing knife 5 out of the slot 24, and thus a new portioning cycle is started.

Simultaneously with the filling and portioning, a previously filled portioning chamber is emptied at another position into an appropriate container.

The portioning piston 8 can, in an alternative construction, also assume the function of the ejecting device 30. In such a construction, the receiving component 2 (FIG. 2) is preferably made in one piece, that is, the bottom plate 28 is affixed to the component 2. For the ejection of the previously portioned material, the receiving component 2 is pushed, in the direction of the center axis 11 for example, over the portioning piston 8 and the piston rod associated therewith until the portioning chamber 4 has been completely emptied by the piston 8. The portioned material is drawn off by appropriate means between piston 8 and severing knife 5 situated in the front of the discharge opening of the filling apparatus 6, and the receiving component is moved back into the filling position.

An additional possible variation is for the filling apparatus 6 together with the severing knife 5 to move away laterally from the filling opening of the portioning chamber 4 after the portioning, and for the portioned material to be ejected from the portioning chamber 4 by means of the portioning piston 8.

Instead of the construction of receiving component 2 as a rotary disk as represented in FIG. 2, the receiving component 2 can also be mounted for movement rectilinearly between the filling and ejection positions transversely of the axis 11. In this case the ejecting device can be disposed, for example, at the position identified as 26 in FIG. 1, alongside the filling point (axis 11) at an appropriate distance therefrom. The manner of operation of this apparatus corresponds to the principle of operation described with reference to FIG. 2, with the exception that the alternation between filling (portioning) and ramming is accomplished by a purely translatory movement of the displaceable receiving component 2. This portioning apparatus can also be constructed on a multiple-system basis, for example with a plurality of successively disposed portioning chambers 4, filling apparatus 6 and ejection devices.

Instead of a knife 5, a bandsaw can also be used with similar effect, the blade thereof being sufficiently broad to completely cover the fill opening of the portioning chamber 4 or the discharge opening of the fill housing 12, as the case may be, after performing the severance. In multi-system apparatus, a sawblade can be introduced simultaneously into the slots 24 of a plurality of portioning stations.

I claim:

1. Apparatus for the volume portioning of compressible, lumpy material, especially pieces of meat and prepared foods, said apparatus comprising a receiving apparatus with at least one passage opening of constant cross section which laterally defines a portioning chamber; a portioning piston with a cross sectional surface complementary to the cross section of the passage opening, which piston can be pushed into the portioning chamber at a first end, is displaceable axially and fixable in at least one position within the latter in order to establish the volume of the portioning chamber formed in the passage opening; a filling apparatus disposed on the fill side of the receiving apparatus, opposite the portioning piston, said filling apparatus having a discharge orifice aligned with the second open end of the passage opening and one compressing piston displaceable coaxially to the portioning piston at least in the filling operation; a slot provided between the second opening end of the passage opening and the discharge aperture of the filling apparatus; a bladed cutting means which is mounted for movement transversely of the axis of movement of the two pistons and can be introduced into the slot such that it substantially snugly closes off the second open end of the passage opening; means for the ejection of the portioned material; and moving means which move at least one of the receiving and filling apparatus relative to the other such that the portioned material in the portioning chamber can be ejected.

2. Apparatus of claim 1, in which the filling apparatus has a substantially hollow-cylindrical fill housing at whose end facing the portioning chamber the discharge opening is formed and whose cylinder wall forms a guide for the compressing piston, a material feeding tube branching off laterally in the area between the completely withdrawn compressing piston and the open end of the fill housing.

3. Apparatus of claim 2, wherein the feeding tube merges into a supply container and a feeding screw extends from the supply container into the feeding tube but terminates outside of the fill housing cylindrical chamber forming the guide for the compressing piston.

4. Apparatus of claim 1, wherein the cutting means is a knife which is mounted for rotation about an axis parallel to the axis of the compressing piston and has such a path of movement and construction that, upon engagement in the slot between portioning chamber and filling apparatus, it closes substantially snugly the discharge-side orifice of the filling apparatus.

5. Apparatus of claim 1, wherein an adjusting drive is provided which fixes the portioning piston at various depths of penetration in the portioning chamber for the setting of various portioning volumes.

6. Apparatus of claim 1, with a drive for the operation of the compressing piston such that at least one defined compressing pressure can be set in the corresponding portioning chamber.

7. Apparatus of claim 2, wherein the portioning chamber has an internal cross secton that is the same as that of the hollow-cylindrical fill housing.

8. Apparatus of claim 1, wherein the common axis of compressing piston and portioning piston runs approximately vertically, the compressing piston with corresponding drive and the portioning piston drive being disposed beneath the receiving apparatus.

9. Apparatus of claim 8, wherein the receiving apparatus is constructed as a rotary disk with a plurality of rows of portioning chambers circularly surrounding the axis of rotation, that the filling apparatus and portioning piston are disposed stationarily in the horizontal plane, that an ejecting means is mounted stationarily at an angular interval from the fill point and above the rotary disk at the radial distance of the portioning chambers from the disk axis of rotation, and that below the rotary disk a stationary bottom plate is mounted coaxially with the portioning piston and coaxially with the ejection means, in which an opening is formed having an aperture cross section corresponding at least to the internal cross section of the portioning chamber.

10. Apparatus of claim 9, wherein all portioning chambers terminate immediately above the upper side of the bottom plate, so that the latter snugly closes the bottom end of the portioning chambers situated outside of the filling and ejecting points, and that the active piston surface of the portioning piston can be brought into one plane with the upper side of the bottom plate.

11. Apparatus of claim 10, wherein at least two rows of portioning chambers disposed in concentric circles about the rotary disk axis are provided between adjacent portioning chambers in a rotary disk, and wherein there are associated with each row one filling apparatus and one ejection means whose position relative to the portioning chambers is such that all filling apparatus and ejection means are alignable simultaneously each with one portioning chamber.

12. Apparatus of claim 1, wherein the receiving apparatus, in the case of stationarily disposed filling apparatus and fixed portioning piston, is adjustable coaxially with the piston axis and in that the portioning piston forms the ejection means.

* * * * *